United States Patent [19]
Woodall, Jr. et al.

[11] Patent Number: 5,708,230
[45] Date of Patent: Jan. 13, 1998

[54] OCEAN SURFACE-DELIVERED ORDNANCE EXPLOSIVE MINE AND OBSTACLE CLEARANCE METHOD

[75] Inventors: Robert C. Woodall, Jr., Pasadena, Md.; Felipe A. Garcia, Panama City, Fla.; John Horton, Panama City, Fla.; William Jones, Panama City, Fla.

[73] Assignee: The United States of America as represented by the Secretary of the Navy, Washington, D.C.

[21] Appl. No.: 673,890

[22] Filed: Jul. 1, 1996

[51] Int. Cl.$^6$ ................................................ B63G 7/02
[52] U.S. Cl. ................................. 102/402; 89/1.13
[58] Field of Search ............................. 89/1.13, 1.11; 102/403, 402, 411, 416, 417, 412, 409, 414, 401

[56] References Cited

U.S. PATENT DOCUMENTS

| | | | |
|---|---|---|---|
| 3,903,798 | 9/1975 | McGraw | 102/403 |
| 3,946,696 | 3/1976 | Lubnow | 114/221 R |
| 4,185,554 | 1/1980 | Anderson et al. | 102/402 |
| 4,215,630 | 8/1980 | Hagelberg et al. | 102/403 |
| 4,993,325 | 2/1991 | Slone, Jr. et al. | 102/402 |
| 5,005,482 | 4/1991 | Reams | 102/420 |
| 5,277,117 | 1/1994 | Bender et al. | 102/402 |
| 5,307,272 | 4/1994 | Butler et al. | 364/424.02 |
| 5,524,524 | 6/1996 | Richards et al. | 89/1.13 |
| 5,598,152 | 1/1997 | Scarzello et al. | 340/850 |

FOREIGN PATENT DOCUMENTS 2 169 246  6/1986  United Kingdom .............. 102/411

OTHER PUBLICATIONS

Global Positioning System: Theory and Applications, vol. II; published by AIAA; pp.304–305, 1996.

*Primary Examiner*—Michael J. Carone
*Assistant Examiner*—Christopher K. Montgomery
*Attorney, Agent, or Firm*—Harvey A. Gilbert

[57] ABSTRACT

A method for ocean surface delivery of ordnance and clearing of explosive mines and obstacles from a navigable sea channel includes the step of providing quantities of ordnance adapted to survive impact and prolonged immersion in sea water and to arm in response to release from a mobile ocean surface vehicle and to pressure actuation upon submersion to a desired depth in sea water and then to detonate in response to receiving a preselected signal transmitted to the ordnance from a standoff location. The method also includes the step of delivering the quantities of ordnance from a mobile ocean surface vehicle toward multiple sites in a navigable sea channel containing obstacles and explosive mines therein so as to cause arming of the ordnance followed by impact thereof with the navigable sea channel and submersion and emplacement thereof at the multiple sites in the navigable sea channel. The ocean surface delivery method further includes the step of transmitting the preselected signal to and receiving the preselected signal by the emplaced armed ordnance so as to cause detonation thereof and the simultaneous synergistic destruction of the obstacles and explosive mines contained in the navigable sea channel. The method also includes the step of marking an amphibious path through the cleared navigable sea channel.

13 Claims, 5 Drawing Sheets

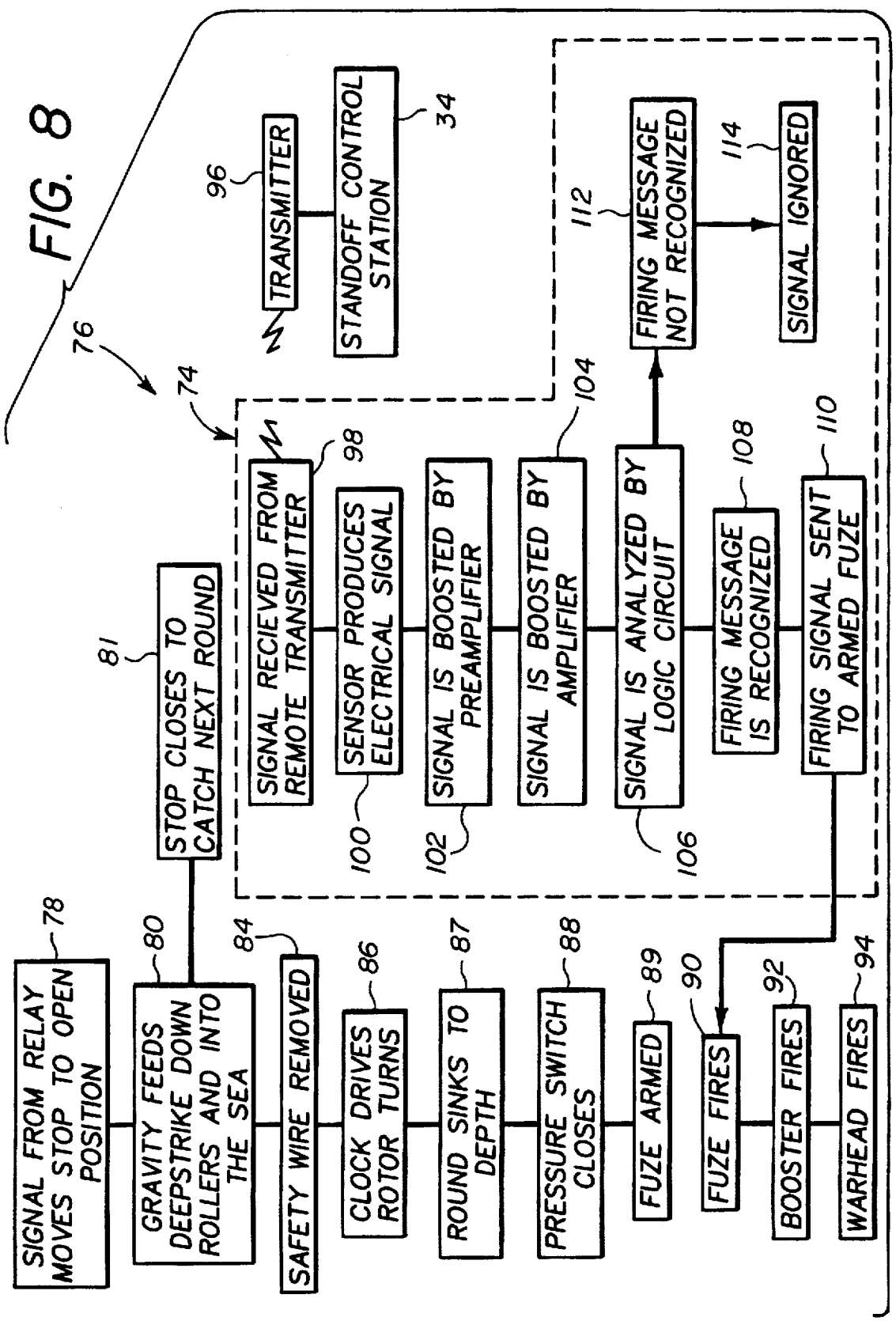

5,708,230

OCEAN SURFACE-DELIVERED ORDNANCE EXPLOSIVE MINE AND OBSTACLE CLEARANCE METHOD

BACKGROUND OF THE INVENTION

1. Field of the Invention

The present invention generally relates to the clearing of obstacles and mines from navigable sea channels and, more particularly, is concerned with a method for ocean surface delivery of explosive ordnance and clearing of explosive mines and obstacles in a navigable sea channel.

2. Description of the Prior Art

An amphibious assault of a defended beach is a dangerous military mission which can easily result in a high rate of casualties. At the present time, several approaches to small scale distributed explosive mine and obstacle clearing systems are being evaluated to support an amphibious assault operation. Such approaches under consideration include one-dimensional (discontinuous line charges), two-dimensional (detonating cord nets and miniature bomblet arrays) systems, mechanical sweep systems, electro-mechanical sweep systems, and one-on-one mine hunting and neutralization techniques.

However, such approaches appear to have several shortcomings. First, they require obstacles to be removed or substantially diminished prior to using such systems in mine clearance operations. Second, such approaches are limited in scale and lack the tonnage necessary for simultaneous obstacle and mine clearing in an in-stride over-the-horizon amphibious assault. Third, such small scale distributed explosive mine clearing systems may require significant amounts of time, numerous deployments, are not very effective in deeper water and still may not create a safely cleared staging area or assault lane of adequate dimension for the fleet to safely traverse. Fourth, such small scale systems require the development of lane marking devices. In view that many of the small scale mine clearing systems, as well as channel marking devices, can only be used safely and effectively once the beach area is secured by friendly forces, their use by amphibious forces advancing by sea to the beach is not feasible. Fifth, current systems require amphibious forces to come into range of enemy fire for an extended period of time in order to deploy such current systems. Sixth, the use of sweeps, mine hunters, and single charge placement techniques are risky, take a long time to emplace, and often do not ensure adequate transit to safety.

Consequently, a need still exists for an explosive mine and obstacle clearing method and additionally for a channel marking method for facilitating an amphibious assault which will overcome the shortcomings of the prior art without introducing new ones in their place.

SUMMARY OF THE INVENTION

The present invention provides a method for ocean surface delivery of ordnance and clearing of explosive mines and obstacles in a navigable sea channel which is designed to satisfy the aforementioned need. The method of the present invention also may incorporate steps to provide for visible marking of an amphibious path through the cleared navigable sea channel. The method provides a deep water, large scale explosive mine clearing capability and an over-the-horizon capability having the simplicity, speed and brute force necessary for a rapid and effective amphibious assault that will minimize exposure to enemy fire, reduce casualties (both personnel and hardware), and free up amphibious mine clearing assets for other missions. Also, detonation of the ordnance so emplaced will create a sensor visible navigable sea channel when used closer to shore.

Deployment of the ordnance would be from a high speed Multi-mission Craft Air Cushion (MCAC), hereafter referred to as a mobile air cushion vehicle, equipped with integral Global Positioning System (GPS) navigation and High Volume Mine Laying (HVML) equipment, hereafter referred to as a multiple mine laying apparatus, for rapidly and accurately emplacing bulk quantities of ordnance to create upon simultaneous detonation a cleared amphibious staging area in a navigable sea channel. The ordnance which can readily be used are mines presently in inventory which are modified to support simultaneous initiation of their warheads by a preselected remotely generated encrypted magnetic signal. The ordnance is modified to arm with their release from the multiple mine laying rack (by pull of an arming lanyard) and submergence (by pressure switch actuation at desired depth) into the ocean. After the ordnance has been emplaced and the mobile air cushion vehicle has then moved away to a safe range, the preselected magnetic signal is transmitted from a standoff platform, received and recognized by the modified target detection devices of the ordnance, and used to simultaneously detonate all emplaced ordnance. Such synergistic detonation of the bulk ordnance will result in the destruction of enemy mines and the clearance of emplaced obstacles at a reduced ordnance weight, by several orders of magnitude, as compared to the use of smaller scale systems and the sequential detonation of explosives. Reducing the amount of explosive necessary for clearance operations in this manner will result in less time needed for the mission as compared to missions employing sequentially detonated bombs.

Accordingly, the present invention is directed to a method for ocean surface delivery of ordnance and clearing of explosive mines and obstacles from a navigable sea channel. The method comprises the steps of: (a) providing quantities of ordnance adapted to survive impact and prolonged immersion in sea water and to arm in response to release from a mobile ocean surface vehicle and to pressure actuation upon submersion to a desired depth in sea water and then to detonate in response to receiving a preselected signal transmitted to the ordnance; (b) delivering the ordnance from a mobile ocean surface vehicle toward multiple sites in the navigable sea channel containing obstacles and explosive mines so as to cause arming of the ordnance by release from the vehicle and submersion to desired depth in the sea channel followed by emplacement thereof at the multiple sites in the navigable sea channel; (c) transmitting the preselected signal; and (d) receiving the preselected signal at the emplaced quantities of armed ordnance so as to cause detonation thereof and simultaneous synergistic destruction of the obstacles and explosive mines in the navigable sea channel.

The preselected signal preferably is an encrypted magnetic signal transmitted simultaneously to all of the emplaced quantities of armed ordnance from a transmitter located at a standoff control station. Further, the quantities of ordnance are preferably delivered from an mobile ocean surface vehicle in the form of a mobile air cushion vehicle equipped with a multiple mine laying apparatus. Alternatively, the ordnance can be delivered from a remote controlled delivery vehicle. Also, the method can further comprise the step of delivering global positioning system markers with the quantities of ordnance to mark an amphibious path through the cleared navigable sea channel.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 8 is detailed flow diagram of the method of the present invention.

DETAILED DESCRIPTION OF THE INVENTION

Overview of the Invention

Figure 1:
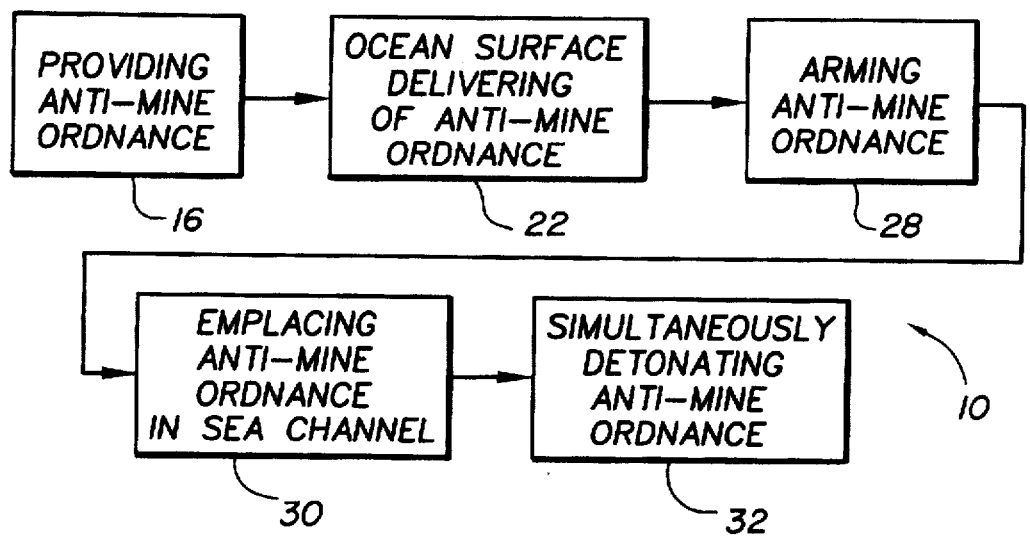
FIG. 1 is a general flow diagram of a method for ocean surface delivery of ordnance and clearing of explosive mines and obstacles from a navigable sea channel in accordance with the present invention.
Figure 2:
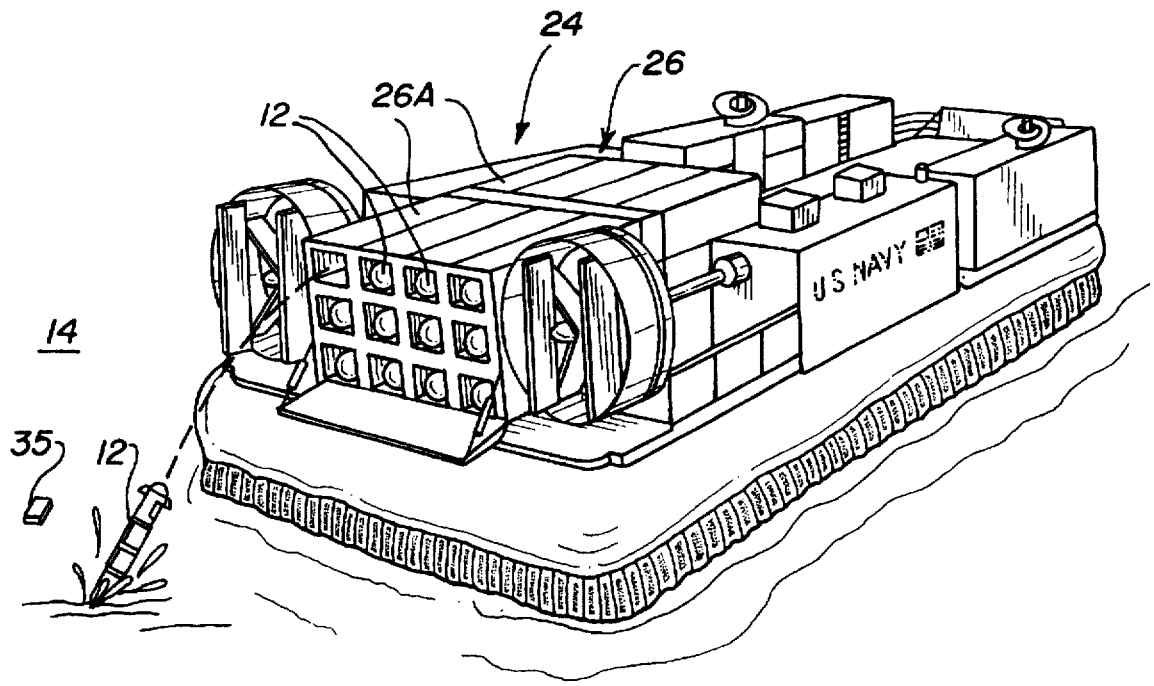
FIG. 2 is a perspective view of a mobile air cushion vehicle equipped with a multiple mine laying apparatus shown delivering a quantity of ordnance toward multiple sites in a navigable sea channel in accordance with the method of the present invention.

Referring now to the drawings and particularly to FIG. 1, there is illustrated in a general flow diagram, generally designated 10, the basic steps of the method of the present invention for ocean surface delivery of ordnance 12 and for clearing of explosive mines and obstacles (not shown) from a navigable sea channel 14 shown in FIG. 2. As one representative example, the sea channel 14 can be an amphibious assault lane.

As per block 16 of the flow diagram 10, the required quantities of anti-mine ordnance 12 provided for emplacement in and clearing of the sea channel 14 can come from a family of prior art mines 18, 20, as depicted in FIGS. 4-7, that are presently in the inventory of the U.S. Government. These ordnance are converted for employment in an anti-mine mode in the method of the present invention. As per block 22 of the flow diagram 10, this family of ordnance 12, commonly referred to as Quickstrike mines, are designed to be delivered from a mobile ocean surface vehicle 24, as seen in FIG. 2, and are adapted to survive impact and to remain functional after prolonged immersion in sea water. The mobile ocean surface vehicle 24 can be a high speed mobile air cushion vehicle 24 equipped with multiple mine laying apparatus 26 for rapidly and accurately delivering all ordnance required to clear an adequate lane for navigation. Such a mission would require the mobile air cushion vehicle 24 to deliver the modified Quickstrike ordnance 12 from the ocean surface by gravity feed or other appropriate means of removal from the multiple mine laying apparatus 26 along a predetermined path ahead of amphibious forces toward multiple sites in the sea channel 14 containing various obstacles and explosive mines. As per block 28 of the flow diagram 10, the release of the ordnance 12 from the mine laying apparatus 26 followed by submersion to the desired depth in the sea channel causes the arming thereof, which is then followed by emplacement, as per block 30 of the flow diagram 10, at the multiple sites in the navigable sea channel 14. As per block 32 of the flow diagram 10, the armed and emplaced quantities of ordnance 12 are then detonated simultaneously with one another in response to receiving a magnetic signal transmitted to the ordnance 12 from a suitable standoff control station 34 (see FIG. 8). Such simultaneous detonation will cause complete destruction of the obstacles and explosive mines in the navigable sea channel 14.

Therefore, prior to landing of initial military assault elements, the sea lane would be cleared by simultaneous detonation of the Quickstrike warheads using a magnetic signaling device aboard any of a number of airborne or sea going platforms. Amphibious forces would then navigate the cleared lane and land on the beach. In addition, in accordance with the method of the present invention, global positioning system markers 35 (FIG. 2) can be employed with the quantities of ordnance 12 so that the amphibious path through the cleared navigable sea channel is visibly marked.

Preferred Embodiment of Invention

Figure 3:
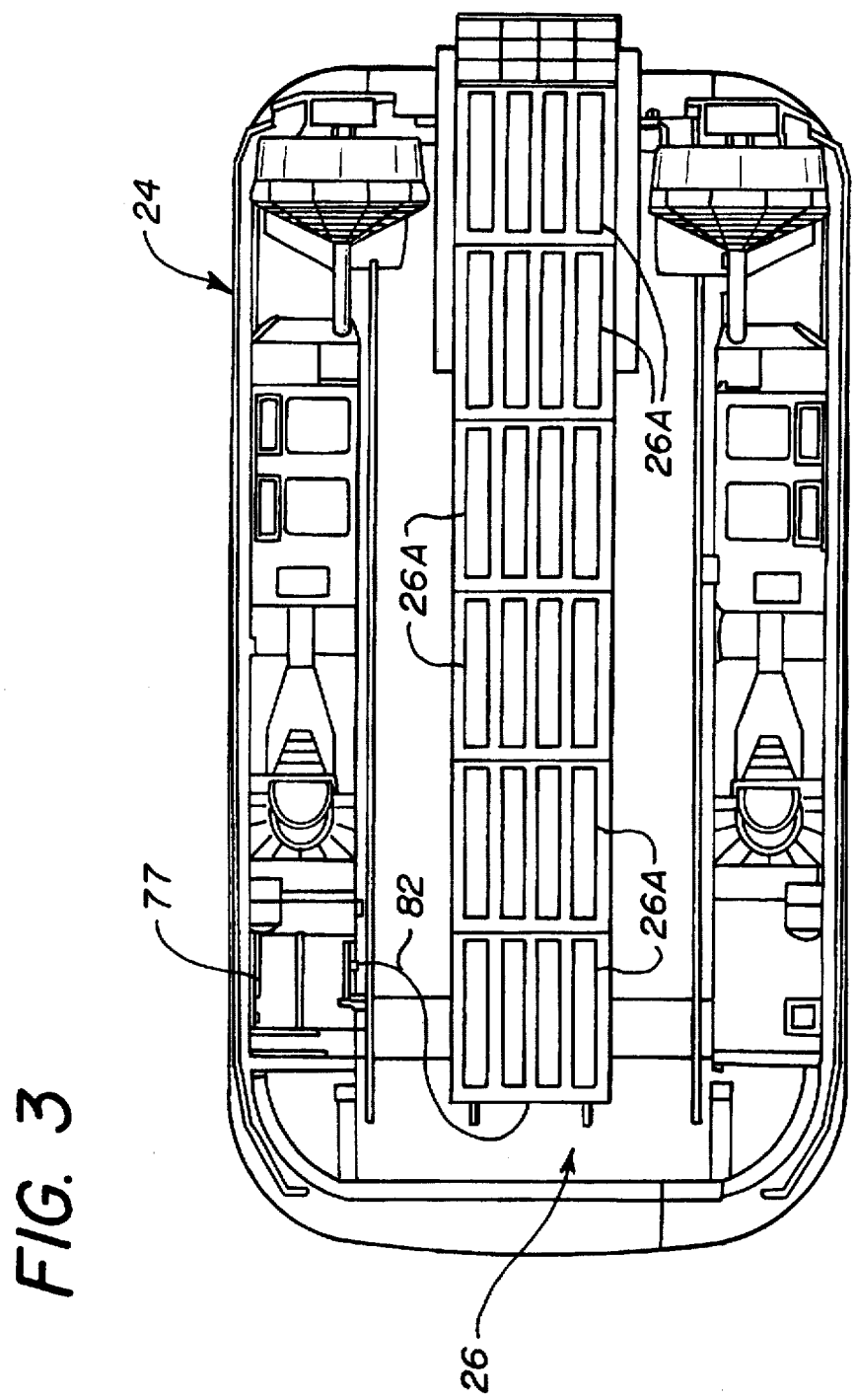
FIG. 3 is a top plan view of the mobile air cushion vehicle with the multiple mine laying apparatus shown fully loaded and prepared to deliver the ordnance into a sea channel.

Referring now to FIG. 3, there is illustrated the high speed mobile air cushion vehicle 24 equipped with multiple mine laying apparatus 26. The modified Quickstrike ordnance 12 is deployed from the vehicle 24 using a multiple mine laying apparatus 26 that was originally developed for use with transport aircraft, namely the C-130 Transport. The apparatus 26 whose construction and operation are well-known to those of ordinary skill in the art, is designed to be an easily transportable, modular, easily installed system which allows aircraft, as well as surface craft, to deploy mines at a higher rate than possible with other assets. The apparatus 26 employs rollers on an incline platform to gravity feed the modified Quickstrike ordnance 12 into the sea. Relay controlled mechanical stops regulate the rate at which the multiple rounds of ordnance are deployed with a series of racks 26A.

With its high speed and large cargo carrying capacity, the mobile air cushion vehicle 24 is an ideal platform from which to deploy the modified Quickstrike ordnance 12 and perform mine clearance operations. The vehicle 24 offers the following features which make it ideally suited to this mine countermeasure laying role: maximum speed of 50 knots, GPS marking ability, platform survivability (underwater blast), multi-mission capability, electrical power available at −28 VDC and 400 Hz, large deck area, existing sweep deck ramp and crane, and an established logistics system. Speed and payload combined, enable this vehicle 24 to lay the modified Quickstrike ordnance 12 at a high rate.

Referring now to FIGS. 4-7, there is illustrated the family of prior art Quickstrike mines 18 and 20, that are presently in the munitions inventory of the U.S. Government (known as MK 62/63/65) and thus are available for employment in the method of the present invention. These ordnance 12 are converted for employment in the anti-mine mode in the method of the present invention by making their signal receivers responsive to a preselected specific encrypted magnetic signal transmission, instead of the usual signal generated by a submarine or ship which these ordnance would ordinarily respond to when functioning in their usual explosive mine mode. Also, the arming lanyard 82 on the ordnance 12 is configured to function with the mine laying apparatus 26, pressure transducers provided in the arming devices of the ordnance are preset to actuate at a preselected depth, and the target detecting device (TDD) of the ordnance are modified to receive a common encrypted magnetic signal in order to simultaneously initiate the warheads by remote means.

Figures 4, 5:
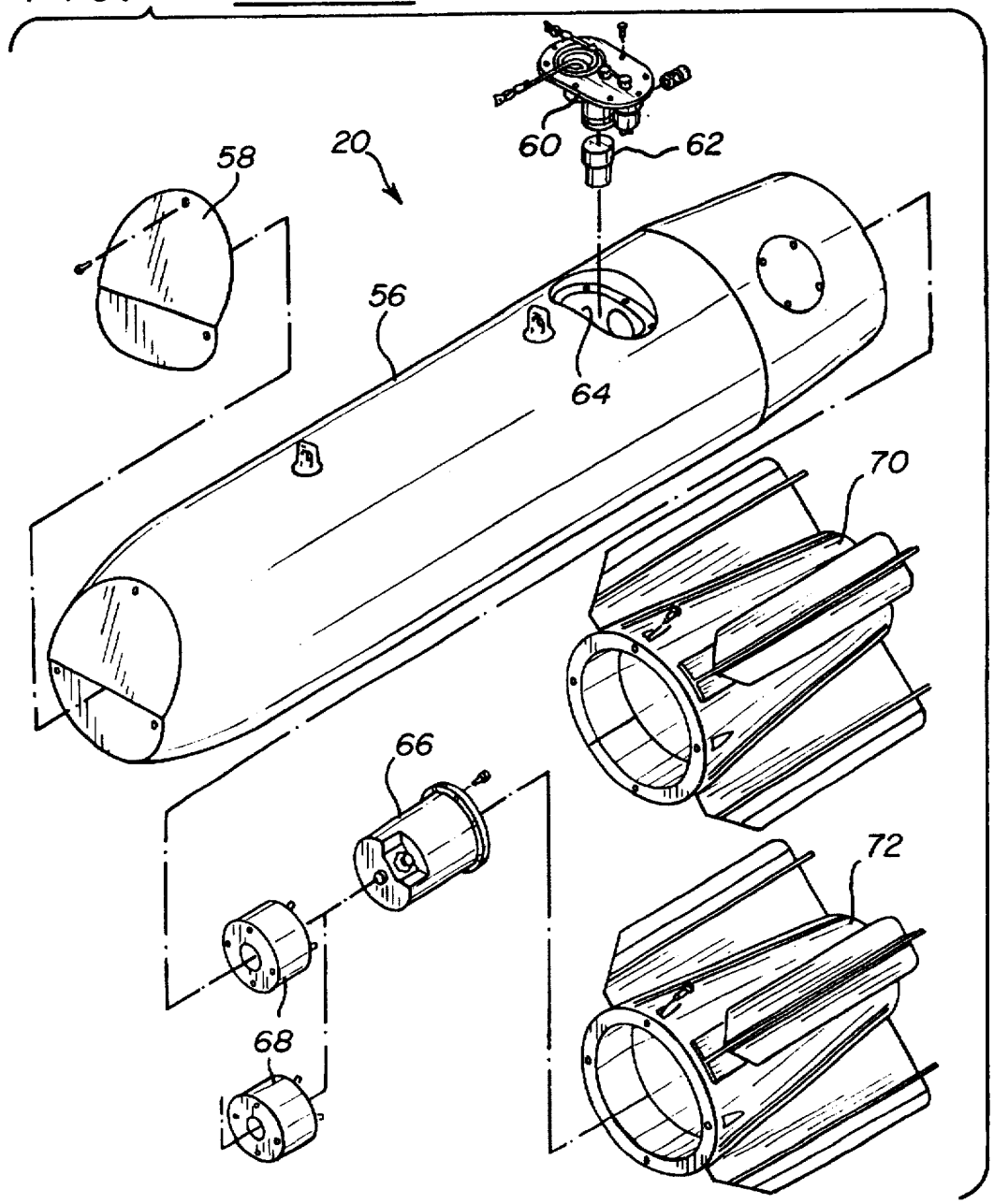
FIG. 4 is a side elevational view of one prior art mine adapted to provide the ordnance used in the method.
FIG. 5 is an enlarged exploded perspective view of the prior art mine of FIG. 4.

Referring to FIGS. 4 and 5, the MK 62 Quickstrike ordnance 18 is an explosive mine weighing 500 pounds. The MK 63 weighs 1000 pounds. As is well-known, the MK 62 ordnance 18 includes an elongated bomb case 36 having an arming device 38 and booster 40 mounted at its nose end and a target detecting device 42 and battery 44 disposed in the bomb case 36. At the rear end of the bomb case 36 is supported a tail section 46, bomb fin adapter 48 and bomb fin 50 in succession. Also, a cable and strap assembly 52 encircles the midsection of the bomb case 36 between a pair of axially displaced hook eyelets 54 attached thereon.

Figure 6:
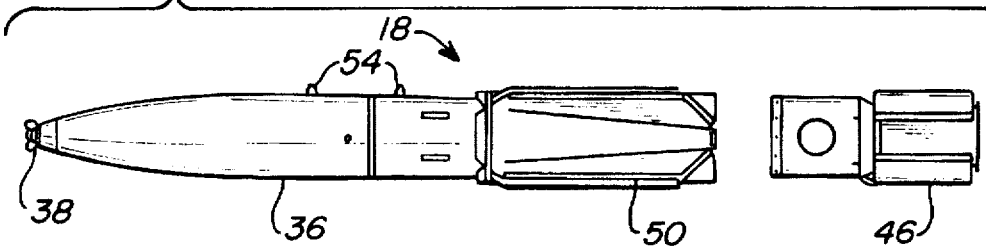
FIG. 6 is a side elevational view of another prior art mine adapted to provide the ordnance used in the method.
Figure 7:
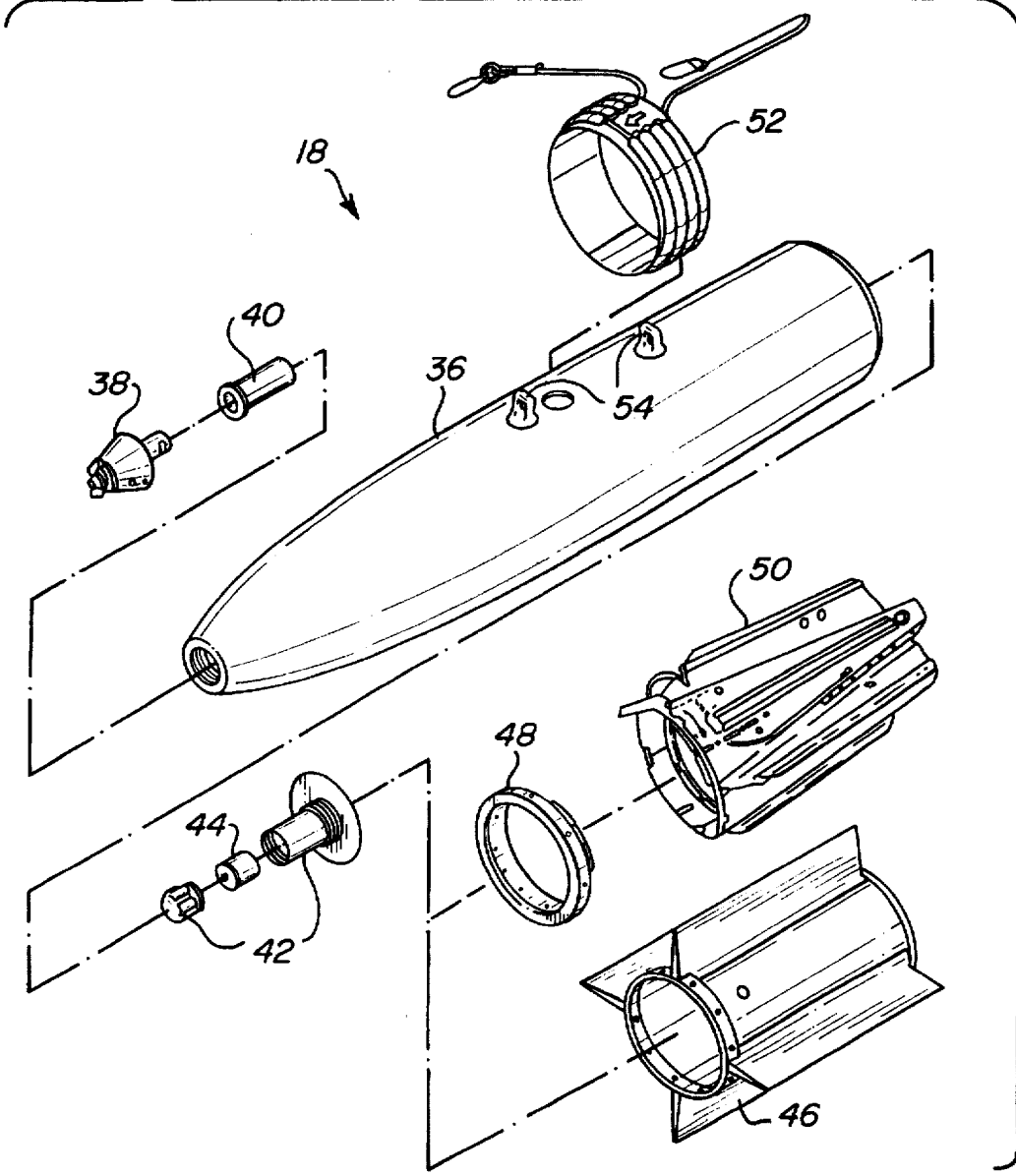
FIG. 7 is an enlarged exploded perspective view of the prior art mine of FIG. 6.

Referring to FIGS. 6 and 7, the MK 65 Quickstrike ordnance 20 is a mine weighing 1500 pounds. As is well-known, the MK 65 ordnance 20 includes an elongated bomb case 56 having a nose fairing 58 attached at its nose end, and a safety device 60 and an arming device 62 mounted in the bomb case 56 through a top opening 64 therein. A target detecting device 66 and battery 68 are disposed in the bomb case 56 adjacent to the arming device 62. At the rear end of the bomb case 56 is supported one or the other of the tail sections 70, 72.

The MK 62/63/65 Quickstrike mines 18, 20 can all use a MK57 or MK71 TDD. For employment in the method of the present invention, the ordnance will have the TDD replaced with a triaxial Search Coil Magnetometer (SCM) and associated logic circuits, called a receiver 74 (FIG. 8) which functions to receive the preselected magnetic signal and transform it into a firing signal in accordance with the steps of the detailed flow diagram of FIG. 8 which will be described below. No other changes are required to convert the Quickstrike mines 18, 20 for employment in the method of the present invention.

Referring also to a detailed flow diagram of the method of the present invention, generally designated 76, in FIG. 8, a signal from a relay at the launch control station 77 on the vehicle 24, as per block 78 of flow diagram 76, moves stops on the mine laying apparatus 26 to an open position, permitting a round of ordnance 12 with one rack 26A of the apparatus 26 to gravity feed, as per block 80 of flow diagram 76, down the incline deck across the rollers thereon and into the sea. The stops thereafter close to catch the next round of ordnance, as per block 81. As the ordnance 12 moves off the laying apparatus, an arming lanyard 82 causes removal of a safety wire from the arming device 38, 62, as per block 84 of flow diagram 76. Thus, upon release from the mobile ocean surface vehicle 24, as per block 80 of flow diagram 76, the Quickstrike converted MK62/63 and MK65 ordnance 18, 20 are armed by an arming device 38, located in the nose end of the ordnance and 62 located aft of the nose end of the ordnance. Removal of the safety wire permits a vane to rotate and operate a clock driven system which functions to release a rotor, allowing it to turn, as per block 86 of flow diagram 76. This aligns a fuze detonator with the remaining firing train components. The foregoing parts of the ordnance arming device are well-known to those skilled in the art and therefore need not be illustrated to understand the method of the present invention.

As per block 87 of the flow diagram 76, the round of ordnance sinks to the desired depth where the pressure switch in the arming device 38, 62 closes to complete arming, as per successive blocks 88, 89. A firing signal from the receiver 74, which has replaced the TDD, initiates the firing train in the arming device 38, 62, as per block 90 of flow diagram 76, to detonate the booster 40, 60 and subsequently fire the warhead, as per successive blocks 92, 94.

Finally, referring again to the detailed flow diagram 76 of FIG. 8, the receiver 74 is precluded from receiving any transmissions until the safety lanyard 82 is pulled out of the ordnance, the clock aligns the rotor, and the pressure switch is closed upon immersion to the desired depth in sea water. The receiver 74 then will not initiate the firing train until it receives the coded magnetic signal transmission from a standoff inductive transmitter, as per block 96 of flow diagram 76, located at the standoff control station 34. Commercial off-the-shelf equipment are available and known by those of ordinary skill in this art to provide the transmitter 96 and receiver 74 which transmit and receive the coded magnetic signal.

When the coded magnetic signal is received from the remote transmitter 96, as per block 98 of flow diagram 76, and sensed by an induction sensor as per block 100 of flow diagram 76, the electrical signal produced in the receiver 74 is boosted in two stages, first, by a preamplifier stage as per block 102 and, second, by an amplifier stage as per block 104. The boosted signal is routed through a logic circuit in the receiver 74, as per block 106 of flow diagram 76, which decodes and recognizes the firing signal, as per block 108. The logic circuit of the receiver 74 then sends a firing signal, as per block 110 of flow diagram 76, to the arming device 38, 62 which, in turn, detonates the booster, as per block 92, and subsequently fires the ordnance warhead, as per block 94. If quantities of the ordnance 12 are present in the same area at the same time and have been coded to recognize the same magnetic firing signal, then all the emplaced ordnance will detonate simultaneously. On the other hand, if the logic circuit of the receiver 74 fails to recognize the firing signal, as per block 112 of flow diagram 76, then the signal is ignored, as indicated by block 114.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim for our invention:

1. A method for ocean surface delivery of ordnance and clearing of explosive mines and obstacles from a navigable sea channel, said method comprising the steps of:

(a) providing quantities of ordnance adapted to survive impact and prolonged immersion in sea water and to arm in response to release from a mobile ocean surface vehicle and to pressure actuation upon submersion to a desired depth in sea water and then to detonate in response to receiving a preselected signal transmitted to the ordnance;

(b) delivering the quantities of ordnance from a mobile ocean surface vehicle toward multiple sites in a navigable sea channel containing obstacles and explosive mines so as to cause arming of the quantities of ordnance by release from the mobile ocean surface vehicle and submersion to desired depth in the sea channel followed by emplacement thereof at the multiple sites in the navigable sea channel;

(c) transmitting the preselected signal in the form of an encrypted magnetic signal to the emplaced quantities of armed ordnance; and (d) receiving the preselected signal at the emplaced quantities of armed ordnance so as to cause simultaneous detonation thereof and destruction of the obstacles and explosive mines in the navigable sea channel.

2. The method of claim 1 wherein the quantities of ordnance are delivered from a mobile air cushion vehicle equipped with a multiple mine laying apparatus.

3. The method of claim 1 wherein the quantities of ordnance are delivered from multiple mine laying apparatus on the mobile ocean surface vehicle.

4. The method of claim 1 wherein the preselected signal is transmitted so that said signal is received by the emplaced quantities of armed ordnance, substantially simultaneously.

5. The method of claim 1 wherein the preselected signal is transmitted from a standoff control station.

6. The method of claim 5 wherein the preselected signal is transmitted so that said signal is received by the emplaced quantities of armed ordnance substantially simultaneously.

7. The method of claim 1 wherein the preselected signal is received so that the emplaced quantities of armed ordnance are detonated substantially simultaneously.

8. A method for ocean surface delivery of ordnance and clearing of explosive mines and obstacles from a navigable sea channel, said method comprising the steps of:

(a) providing quantities of ordnance adapted to survive impact and prolonged immersion in sea water and to arm in response to release from a mobile ocean surface vehicle and to pressure actuation upon submersion to a desired depth in sea water and then to detonate in response to receiving a preselected signal transmitted to the ordnance;

(b) delivering the quantities of ordnance from a mobile ocean surface vehicle toward multiple sites in a navigable sea channel containing obstacles and explosive mines so as to cause arming of the quantities of ordnance by release from the mobile ocean surface vehicle and submersion to desired depth in the sea channel followed by emplacement thereof at the multiple sites in the navigable sea channel;

(c) delivering global positioning system markers with the quantities of ordnance to mark an amphibious path through the cleared navigable sea channel;

(d) transmitting the preselected signal to the emplaced quantities of armed ordnance; and (e) receiving the preselected signal at the emplaced quantities of armed ordnance so as to cause simultaneous detonation thereof and destruction of the obstacles and explosive mines in the navigable sea channel.

9. The method of claim 8 wherein the preselected signal is an encrypted magnetic signal.

10. A method for ocean surface delivery of ordnance and clearing of explosive mines and obstacles from a navigable sea channel, said method comprising the steps of:

(a) providing quantities of ordnance adapted to survive impact and prolonged immersion in sea water and to arm in response to release from a mobile ocean surface vehicle and to pressure actuation upon submersion to a desired depth in sea water and then to detonate in response to receiving a preselected signal transmitted to the ordnance;

(b) delivering the quantities of ordnance from a mobile ocean surface vehicle toward multiple sites in a navigable sea channel containing obstacles and explosive mines so as to cause arming of the quantities of ordnance by release from the mobile ocean surface vehicle and submersion to desired depth in the sea channel followed by emplacement thereof at the multiple sites in the navigable sea channel;

(c) transmitting the preselected signal from a standoff control station to the emplaced quantities of armed ordnance; and (d) receiving the preselected signal at the emplaced quantities of armed ordnance so as to cause simultaneous detonation thereof and destruction of the obstacles and explosive mines in the navigable sea channel;

(e) the preselected signal being a common magnetic signal transmitted so that said signal is received by all the emplaced quantities of armed ordnance substantially simultaneously.

11. The method of claim 10 wherein the preselected signal is an encrypted magnetic signal.

12. A method for ocean surface delivery of ordnance and clearing of explosive mines and obstacles from a navigable sea channel, said method comprising the steps of:

(a) providing quantities of ordnance adapted to survive impact and prolonged immersion in sea water and to arm in response to release from a mobile ocean surface vehicle and to pressure actuation upon submersion to a desired depth in sea water and then to detonate in response to receiving a magnetic signal transmitted to the ordnance from a standoff control station;

(b) delivering the quantities of ordnance from a multiple mine laying apparatus on a mobile air cushion vehicle toward multiple sites in a navigable sea channel containing obstacles and explosive mines so as to cause arming of the quantities of ordnance by release from the mobile ocean surface vehicle and submersion to desired depth in the sea channel followed by emplacement thereof at the multiple sites in the navigable sea channel;

(c) transmitting the magnetic signal from the standoff control station so that said signal is received by the emplaced quantities of armed ordnance substantially simultaneously; and (d) receiving the magnetic signal simultaneously at the emplaced quantities of armed ordnance so as to cause simultaneous detonation thereof and synergistic destruction the obstacles and explosive mines in the navigable sea channel.

13. The method of claim 12 further comprising:

delivering global positioning system markers with the quantities of ordnance to mark an amphibious path through the cleared navigable sea channel prior to detonation.

* * * * *